US010956933B2

(12) United States Patent
Greenzeiger et al.

(10) Patent No.: US 10,956,933 B2
(45) Date of Patent: *Mar. 23, 2021

(54) DETERMINING USER ENGAGEMENT

(71) Applicant: Apple Inc., Cupertino, CA (US)

(72) Inventors: Michael Froimowitz Greenzeiger, Sunnyvale, CA (US); Steven C. Bredenberg, Campbell, CA (US); Christopher John Foster Bullen, San Francisco, CA (US); Mark C. Lay, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/038,481

(22) Filed: Jul. 18, 2018

(65) Prior Publication Data
US 2018/0322529 A1 Nov. 8, 2018

Related U.S. Application Data

(63) Continuation of application No. 14/057,388, filed on Oct. 18, 2013, now Pat. No. 10,055,756.

(51) Int. Cl.
*G06Q 30/00* (2012.01)
*G06Q 30/02* (2012.01)

(52) U.S. Cl.
CPC .............. *G06Q 30/0251* (2013.01)

(58) Field of Classification Search
None
See application file for complete search history.

(56) References Cited

U.S. PATENT DOCUMENTS 6,505,169 B1 1/2003 Bhagavath
7,284,201 B2 10/2007 Cohen-Solal
7,633,076 B2 12/2009 Huppi
7,764,641 B2 7/2010 Pelton
(Continued)

FOREIGN PATENT DOCUMENTS

CN 102222300 A * 10/2011 ............. G06Q 30/00
JP 2015060598 3/2015
(Continued)

OTHER PUBLICATIONS

Nadine Glas, Ken Prepin, Catherine Pelachaud. Engagement driven Topic Selection for an Information-Giving Agent. Workshop on the Semantics and Pragmatics of Dialogue. (SemDial 2015—goDial), Aug. 2015, Gothenburg, Sweden. Proceedings of the 19th Workshop on the Semantics and Pragmatics of Dialogue. (Year: 2015).*
(Continued)

*Primary Examiner* — James A Reagan
(74) *Attorney, Agent, or Firm* — Polsinelli LLP

(57) ABSTRACT

Systems, methods, and computer-readable storage media for determining user engagement levels during a presentation of content. The system first collects data associated with a user session at a client device. Next, the system predicts a user engagement level during the user session by applying an engagement predicting rule to the data. The system can predicts respective user engagement levels for various segments of the presentation by applying one or more engagement predicting rules to the data. The system then presents invitational content based on the user engagement level.

20 Claims, 6 Drawing Sheets

(56) References Cited

U.S. PATENT DOCUMENTS

| | | | |
|---|---|---|---|
| 7,805,129 | B1 | 9/2010 | Issa |
| 8,040,233 | B2 | 10/2011 | Adappa et al. |
| 10,055,756 | B2* | 8/2018 | Greenzeiger ...... G06Q 30/0251 |
| 2002/0052925 | A1 | 5/2002 | Kim et al. |
| 2004/0002972 | A1 | 1/2004 | Pather et al. |
| 2004/0128359 | A1 | 7/2004 | Hovitz et al. |
| 2004/0255148 | A1 | 12/2004 | Monteiro et al. |
| 2008/0163312 | A1 | 7/2008 | Faust et al. |
| 2008/0307454 | A1 | 12/2008 | Ahanger et al. |
| 2010/0035656 | A1 | 2/2010 | Pan |
| 2010/0042470 | A1 | 2/2010 | Chang et al. |
| 2010/0138416 | A1 | 6/2010 | Bellotti |
| 2010/0222046 | A1 | 9/2010 | Cumming |
| 2010/0033231 | A1 | 12/2010 | Kamar et al. |
| 2011/0161998 | A1 | 6/2011 | Alberth et al. |
| 2011/0258039 | A1* | 10/2011 | Patwa ................ G06Q 30/00 705/14.45 |
| 2011/0270679 | A1 | 11/2011 | Tziortzis et al. |
| 2012/0117250 | A1 | 5/2012 | Santamaria et al. |
| 2012/0206322 | A1* | 8/2012 | Osterhout .......... G02B 27/0093 345/8 |
| 2014/0040370 | A1* | 2/2014 | Buhr .................. H04L 67/306 709/204 |
| 2015/0071427 | A1* | 3/2015 | Kelley ............... G06Q 30/0201 379/265.09 |
| 2015/0112796 | A1* | 4/2015 | Greenzeiger ...... G06Q 30/0251 705/14.49 |

FOREIGN PATENT DOCUMENTS

| | | | | |
|---|---|---|---|---|
| JP | 2015060598 A | * | 3/2015 | ......... G06F 17/3053 |
| WO | 2008051472 | | 5/2008 | |
| WO | 2011067675 | | 6/2011 | |
| WO | WO-2014120716 A2 | * | 8/2014 | ............. G06F 3/013 |

OTHER PUBLICATIONS

Nadine Glas et al. Engagement driven Topic Selection for an Information-Giving Agent. Workshop on the Semantics and Pragmatics of Dialogue. (SemDial 2015—goDial), Aug. 2015, Gothenburg, Sweden. http://semdial.org/anthology/Z15-Glas_semdial_0009.pdf (Year: 2015).*

Marketo. The Definitive Guide to Engaging Email Marketing. (Jun. 15, 2013). Retrieved online Nov. 27, 2020. https://go.marketo.com/rs/marketob2/images/Definitive-Guide-To-Engaging-Email-Marketing.pdf (Year: 2013).*

MacLeod et al. Engaging for success: enhancing performance through employee engagement. (Jul. 1, 2009). Retrieved online Nov. 27, 2020. https://engageforsuccess.org/wp-content/uploads/2015/08/file52215.pdf (Year: 2009).*

International Search Report and Written Opinion from PCT Application No. PCT/US2014/013435 dated Jun. 18, 2014.

International Preliminary Report on Patentability from PCT Application No. PCT/US2014/013435 dated Aug. 4, 2015.

"Frequently Asked Questions/Gimbal," http://www.gimbal.com/faq/, 2013 Qualcomm Labs, Inc., 10 pages.

* cited by examiner

DETERMINING USER ENGAGEMENT

CROSS-REFERENCE TO RELATED APPLICATIONS

This application is a Continuation of U.S. patent application Ser. No. 14/057,388, filed on Oct. 18, 2013, entitled "DETERMINING USER ENGAGEMENT," which is expressly incorporated by reference herein in its entirety.

TECHNICAL FIELD

The present technology pertains to presenting invitational content, and more specifically pertains to determining user engagement during a presentation of invitational content.

BACKGROUND

Mobile advertising is widely used by advertisers to market their products via mobile devices. Given the widespread availability of mobile devices, mobile advertising can be an extremely effective way for advertisers to reach a wide mass of potential customers and induce numerous users to purchase their products. By targeting mobile users with effective mobile advertisements, advertisers can yield large financial returns from their mobile advertisements. Not surprisingly, many advertisers continuously measure the performance of their advertisements to understand how, if necessary, they can optimize their advertisements for a better performance.

Many metrics are currently available for advertisers to measure the performance of their advertisements. For example, advertisers can measure the ratio of conversions obtained through their advertisements. In addition, advertisers can typically measure the number of views of a particular advertisement, to estimate the number of users reached by the particular advertisement and advertisement medium used. Unfortunately, however, it is generally difficult for advertisers to compare different advertisements based on the number of views measured, particularly when the different advertisements have varying amounts of content. Moreover, advertisers are currently unable to accurately and effectively determine the user's time spent engaging in an advertisement, and thus are limited in their understanding of the effects and performance of their advertisements.

Yet the user's time spent engaging in an advertisement can vary significantly, particularly in the mobile context. For example, mobile users frequently use their mobile device while engaging in other activities. Thus, mobile users are often distracted or disengaged at some point during their mobile session. And advertisers, on the other hand, are unable to determine the user's time spent engaged in the advertisement, or even whether the user was distracted or disengaged during any part of the advertisement. Consequently, advertisers are greatly limited in their ability to optimize their advertisements. Moreover, without accurate information regarding the user's engagement in an advertisement, it is very difficult to prevent click fraud from publishers seeking to inflate the metrics for their applications without actually showing the advertisements to real users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to determine a user's time spent, which can refer to an amount of time spent by a user engaged in content provided in a user session. The user's time spent can be used as a metric to optimize content delivered to the user, advertisement campaigns, presentation strategies, targeting strategies, and so forth. In some cases, the user's time spent can be used to modify the presentation of content. For example, a presentation of content can be paused while the user is inactive or disengaged, and resumed once the user becomes attentive or active once again. Information relating to the user's time spent can also be used to determine a presentation's performance with the user and the user's reaction to specific aspects of the presentation. Further, the user's time spent can also be reported to advertisers, publishers, networks, and so forth, which they can then use to optimize the presentation of content or campaign, for example. In addition, the user's time spent can be used to prevent fraud based on inaccurate metrics, such as click fraud from publishers, and can help determine more accurate and realistic metrics for mobile content.

Disclosed are systems, methods, and non-transitory computer-readable storage media for determining user engagement during a presentation of content. The system first collects data associated with a user session at a client device. The client device can be a mobile device, a laptop, a smartphone, smart glasses, a tablet computer, a desktop computer, a portable media player, a smart television, a gaming system, or any other device. Moreover, the user session can include, for example, a presentation of content at the client device, such as an advertisement, a video, a file, text, an image, media content, etc.

The data can include information about the type of content presented at the client device during the user session. The type of content presented can help define or predict what type of interaction or engagement is expected from the user. For example, the data can indicate that the presentation includes video content, which can suggest that the system should expect a passive engagement by the user, where the user simply watches the video content without actively interacting with the content. By contrast, the data can indicate that the presentation includes gaming content, and thus suggest that the system should expect an interactive engagement by the user. Thus, if the system detects user inactivity, the type of content in the presentation indicated by the data can be informative with respect to whether the user is inactive because the user is disengaged or because the user is passively engaged.

The data can also include information about one or more user interactions in the user session. For example, the data can include any inputs associated with the user session, such as a gesture, a view, a request, a click, an activity, a navigation command, an action, etc. The data can also include details about the inputs, how the inputs were provided, how the inputs were expected to be provided, whether any errors were triggered, context information regarding the inputs, and so forth. For example, the data can indicate that the user swiped an area of the client device that is not within the boundaries of an expected or permitted input, such as a swipe. Such an unexpected input can suggest that the user was distracted or disengaged when he or she provided the input. For example, the input can be an accidental input received by the client device while the client device was in the user's pocket or purse.

The data can also include sensor data. The sensor data can refer to any data collected, measured, captured, or detected by a sensor, such as a sensor on the client device. For example, the sensor data can include data obtained from an accelerometer, a gyroscope, a global positioning system (GPS), a camera, a microphone, a touch screen, a light sensor, a scanner, a magnetometer, a pedometer, a timer, etc. In some embodiments, the sensor data can include information regarding the angle or plane of the client device, the motion or movement of the client device, the motion or movement of surrounding objects, the position or location of the client device, an eye gaze of a user at the client device, and/or an amount of ambient light. The sensor data can also include changes to any of the previously-described information. For example, the sensor data can include a change in the position or location of the client device.

The data can be collected at one or more specific times within the user session. For example, the data can be collected at predefined times or intervals throughout the user session. In some cases, the data can be collected at regular intervals during the user session. For example, the data can be collected every five seconds throughout the user session. In other cases, the data can be collected continuously throughout the user session. Thus, for example, the data can be collected for every second of the user session. Moreover, the data can be associated with one or more portions of the user session. For example, the data can represent information collected within the first five minutes of the user session. Further, the data can be associated with the entire user session. For example, the data can represent information collected throughout the entire user session. In some cases, the data can include all user interactions or inputs throughout the entire user session, all detected movements or motions of the client device throughout the user session, every position of the client device throughout the user session, every location of the client device throughout the user session, etc.

Next, the system can predict a user engagement level during the user session by applying an engagement predicting rule to the data. The user engagement level can specify, for example, whether the user is/was active, inactive, attentive, inattentive, engaged (passively or actively), disengaged, etc. The engagement predicting rule can refer to one or more rules and conditions. Moreover, the engagement predicting rule can define a type of activity or condition associated with one or more predefined user engagement levels. For example, the engagement predicting rule can specify that an input from the user indicates active engagement by the user. The engagement predicting rule can also include additional conditions associated with a type of activity, and further define user engagement levels associated with the additional conditions. For example, the engagement predicting rule can specify that input from the user indicates active engagement by the user, unless the input is unexpected input or incorrect input. Thus, if the user is expected to swipe the top of the screen, the engagement predicting rule can specify the a swipe at the top of the screen from the user indicates active engagement, but a different type of input, such as a click at the bottom of the screen, indicates inactive engagement.

The engagement predicting rule can also include a threshold for satisfying one or more user engagement levels. Moreover, the engagement predicting rule can include a threshold for any activities and/or conditions associated with a user engagement level. For example, the engagement predicting rule can specify one or more types of activities that must be detected by the system to satisfy a user engagement level of active, and a threshold amount of activity that must be detected for the one or more types of activities in order to positively detect the one or more types of activities. To illustrate, the engagement predicting rule can specify that one way that a user engagement level of active would be satisfied is if the data identifies at least a negligible amount of movement and at least a certain amount of likelihood that the client device is facing upward, facing the user, and/or within a specific distance relative to the user's eyes. In some embodiments, the engagement predicting rule can assume that when a user is holding the client device, the sensors in the client device will be able to detect at least some amount of motion or movement, and that only if the client device is static, on a rigid surface, will there be no detection of any motion or movement, and thus, even small amounts of detected motion or movement is sufficient to indicate that the user is holding the client device and therefore engaged in the content at the client device. Similarly, if the data does not indicate any motion or movement at all, the system can assume that the client device is not being held by the user, and this can indicate that the user is inactive—although the engagement predicting rule can specify one or more requirements or conditions to reach a determination that the user is inactive.

In some embodiments, the engagement predicting rule can specify a first threshold for a single activity or condition to satisfy an engagement level, without more, and a second threshold for that activity or condition to satisfy the engagement level when combined with another activity or condition. For example, the engagement predicting rule can specify that a correct gesture detected from a user within the last five seconds alone is sufficient to satisfy an active engagement level. Here, the first threshold is the gesture within five seconds. On the other hand, the engagement predicting rule can specify that if the gesture is detected within more than five seconds but less than ten seconds, the gesture can be sufficient to satisfy an active engagement level if another activity or condition is satisfied, such as a motion or movement being detected. Thus, for example, if the gesture is detected within seven seconds, the gesture can indicate an active user engagement if, in addition to the gesture, the system detects some movement. In this example, the second threshold refers to the gesture being more than five seconds but less than ten seconds. In other embodiments, the engagement predicting rule can specify multiple levels of thresholds and criteria, where different outcomes are defined for the same activity or condition based on varying thresholds, and different outcomes are also defined for different combinations of activities or conditions based on respective thresholds and/or the types of activities or conditions.

The engagement predicting rule can also include exception(s). For example, the engagement predicting rule can include exceptions for specific types of content where a user engagement is expected to be different. In some cases, the engagement predicting rule can include an exception for video content, which the user typically consumes passively. Thus, the engagement predicting rule can specify that, in some cases where no motion or movement is detected at the client device and the rule would otherwise indicate a user engagement level of inactive or disengaged, the user engagement level can be active if the relevant content includes video content.

In some embodiments, the user engagement level can be determined or predicted by comparing sensor data with one or more predetermined threshold values to identify a motion or movement of the client device. Here, the motion or movement can include, for example, stationary, holding (i.e., being held by a user), user propelled movement, or traveling, such as traveling by automobile, train, bicycle, horse, or airplane, depending on the characteristics of the motion or movement detected. In some cases, the user engagement level can be active if the system determines that the user is holding the client device within a threshold, and inactive if the system determines that the client device is stationary. However, the system can otherwise set the engagement level as active if the system determines that the client device is stationary but the relevant content includes video content (e.g., the user session includes a presentation of video content) or the system has recently detected user activity (e.g., user activity within a threshold time).

The system can then present content, such as invitational content, based on the user engagement level. The system can also modify a presentation of content based on the user engagement level. For example, if the user engagement level is inactive, the system can pause the presentation of content until the user engagement level changes to active or attentive. Here, the system can make different determinations of user engagement level as the presentation of content or user session progresses (e.g., periodically), pause the presentation of content when a user engagement level is inactive, and resume the presentation of content when the user engagement level changes back to active or attentive. The system can also record user engagement levels and associated content or user session information, and/or report such information to another device, such as a content delivery system or a server, for example. The system can keep statistics of user engagement levels and target content based on previous user engagement levels. For example, if the system determines that a first advertisement is associated with inactive user engagement levels but a second advertisement is associated with more active user engagement levels (i.e., more instances of active levels and/or higher levels of engagement), then the system can select to send the second advertisement in lieu of, or in addition to, the first advertisement, or otherwise modify a campaign of invitational content based on the statistics associated with the user engagement levels.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and efficient metrics for time spent and user engagement levels. Disclosed are systems, methods, and non-transitory computer-readable storage media for determining user engagement levels during a presentation of content. A brief introductory description of an exemplary configuration of devices and a network is disclosed herein. A detailed description of time spent metrics and optimization of user engagement metrics, and exemplary variations will then follow. These variations shall be described herein as the various embodiments are set forth. The disclosure now turns to FIG. 1.

Figure 1:
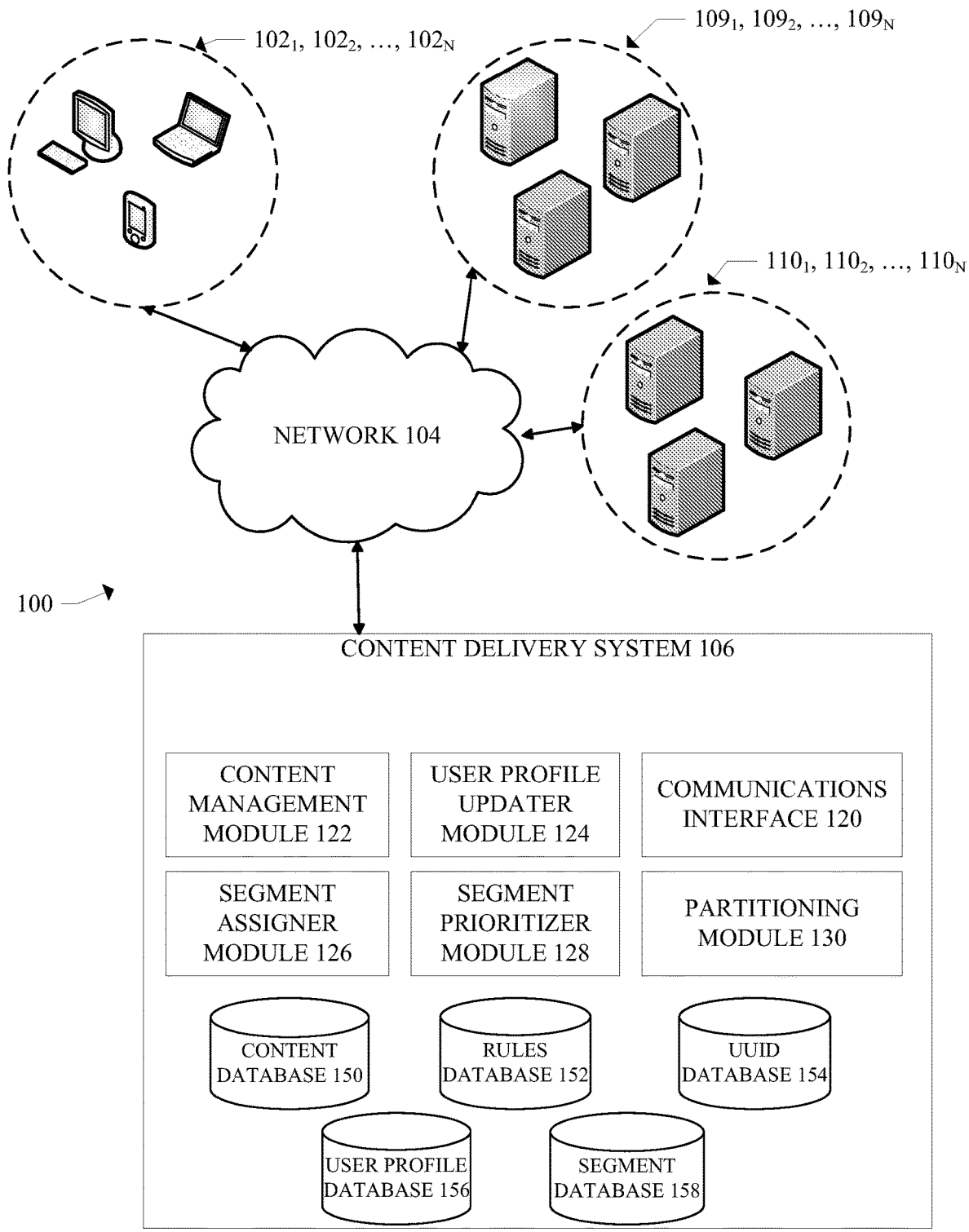
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, ..., $109_n$ (collectively "109") and content from one or more secondary content providers $110_1$, $110_2$, ..., $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a partitioning module 130. The partitioning module 130 can perform partitioning tasks based on the configuration of the content delivery system 106. In some configurations, the partitioning module 130 can divide content, such as a presentation of content, or a user session into partitions of time. The partitioning module 130 can divide the content or user session as further described below in FIGS. 2-3. While FIG. 1 illustrates the partitioning module 130 as a component of the content delivery system 106, one of ordinary skill in the art will readily recognize that the partitioning module 130 can be separate from the content delivery system 106. For example, in some cases, the partitioning module 130 can be a component of content provider 109$_i$, content provider 110$_i$, user terminal 102$_i$, or any other server or client device.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
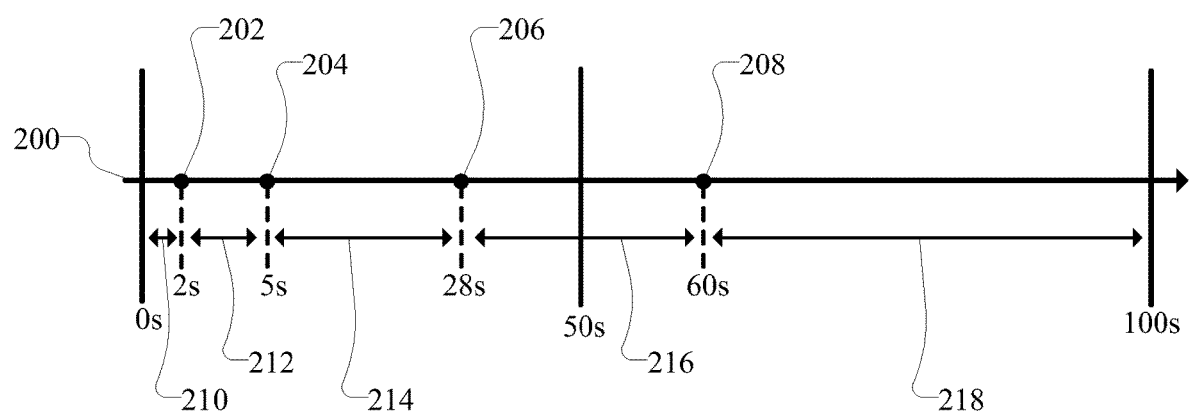
FIG. 2 illustrates an exemplary presentation with data collection events.

The disclosure now turns to a discussion of time spent metrics and optimization of user engagement levels, followed by a discussion of an exemplary presentation with data collection events, illustrated in FIG. 2.

Recent studies have shown that mobile users frequently use their mobile devices while watching television or while engaged in other activities at the same time. Mobile advertising is thus impacted by users ceasing use of their mobile devices and advertisements in the middle of sessions, even more than traditional online advertising. Advertisers would generally prefer to know that the user is present and engaged with the device for the entire duration of their session, rather than have the time when the user is involved with another task counted towards time spent metrics. In fact, in some cases, it may be desirable to actually pause the user experience so once the user becomes engaged once again, he or she can return to his or her session at the same point where they left off.

Time spent by a user engaging in invitational content can be used as a metric to optimize the invitational content and report statistics to customers, advertisers, and publishers. A time spent metric can be used, for example, to maximize and showcase how much engagement advertisers receive for their campaigns. A user's time spent in a user session can be correlated with this type of engagement. However, time spent can provide a more comprehensive and realistic representation of the user's experience and engagement, as time spent can include any time the user spends actively engaging in the content throughout the user session, as well as any time the user spends passively engaging in the content, and can also ignore any time the user spends disengaged with the content.

The gyroscope and accelerometer of the mobile device can be used as sources of sensed information indicating whether the user is present or absent. Typically, when the user holds the mobile device, the user will not be able to hold the device perfectly still in such a way that the gyroscope or the accelerometer are not triggered to some degree. Thus, a signal from the gyroscope and/or accelerometer can be implemented to detect whether the user is holding the mobile device in their hand, or whether the mobile device otherwise remains stationary on a surface. Moreover, touch gestures registered on the screen of the mobile device can provide information about the activity and status of the user. If a touch gesture is recorded by the mobile device, then it is highly probable that the user is present and engaged, even if the mobile device's sensors indicate that the mobile device is stationary. Further, when the mobile device is playing video content, it is common for users to place the mobile device on a surface and cease to interact with the mobile device while the video content is playing. In this case, the sensors on the mobile device can detect that the mobile device is stationary, however, such lack of interaction can be interpreted as passive engagement by the user, since the user is not expected to interact with the mobile device when the mobile device is playing video content.

To determine a total time spent by a user engaging in a session, any period of inactivity or disengagement can be subtracted from the total time of the session to ensure that only active periods are accounted for in the total time spent. Thus, when the time spent for an individual session, a group of sessions, or an entire campaign is calculated, the time from when the inactive event occurs to the next qualifying active event can be excluded from the total. Additionally, in some embodiments, the presentation of content can be paused until the user becomes active again. For example, the advertising (Ad) unit can be frozen until the user picks up the mobile device again or performs a touch gesture. Further, in some cases, the system can also track which user segments tend to abandon devices in the middle of sessions, and optimize traffic away from those segments of users by calculating an inactivity rate for that user segment and implementing a rule to avoid user segments which have inactivity rates over a given threshold. Alternatively, the system can target user segments that high low rates of inactivity, within a predefined threshold, in order to target users that are more likely to be engaged in the content.

The disclosure now turns to FIG. 2, which illustrates an exemplary presentation 200 with data collection events 202-208. The presentation 200 can be a session, a group of sessions, a campaign, or a presentation of any content, such as text, audio, video, images, and/or any other type of media content. The data collection events 202-208 can include any event that can yield information that is potentially relevant to determining user engagement levels. For example, the data collection events 202-208 can include an input event, an activity event, a measurement, a signal, an alert, a notification, a status event, a detected change, etc. A measurement can include any measurement obtained from a sensor associated with the user's device, such as a movement of the device, a motion of the device and/or a surrounding object, a tilt or angle of the device, a location of the device, a velocity of the device, an acceleration of the device, a distance of the device in relationship to the user or any other object, an eye gaze of the user, etc. In some cases, collection of the data collection events 202-208 can be triggered based on a threshold associated with the specific type of collection event. For example, collection of data associated with a movement event can be triggered when a sensor detects a specific amount of motion, such as an amount of motion estimated to result from a user holding the device. In some cases, the data from the data collection events 202-208 can be collected periodically even if there is no change to the data or otherwise any triggering event. For example, various types of measurements can be calculated and collected at regular intervals throughout the presentation 200 in order to capture a snapshot of the presentation 200 at the regular intervals.

As previously mentioned, the data collection events 202-208 can include data collected from any event that can yield information that is potentially relevant to determining user engagement levels. To this end, the data collection events 202-208 can then be used to estimate or predict user engagement levels throughout the presentation 200, during periods 210-218 between the data collection events 202-208. For example, data collection event 202 can be a gesture received from a user. Based on the gesture, the period 210 before the gesture (i.e., data collection event 202) can be identified as active, indicating that the user was engaged during this period. The reasoning can be that the user was likely engaged in the content prior to the gesture, and that such engagement in fact prompted the gesture. In other words, the gesture can be assumed to be in response to the content delivered to the user prior to the gesture. In some cases, the period 212 after the gesture (i.e., data collection event 202), or a predefined portion of the period 212 such as the first five minutes of the period 212, can similarly be identified as active, based on the assumption that the user likely remains engaged at least for some time after the user provides the gesture.

Data collection event 204 can be, for example, motion detected at the device. Such motion can be detected based on a threshold, as previously explained. Moreover, such motion can indicate that the device is not stationary on a rigid surface, and thus likely to be in use by the user. Therefore, the motion can be used to infer that the user was active during the periods before and/or after the motion, viz.: periods 212 and 214. Indeed, the information regarding the movement at data collection event 204 can be considered along with the recent gesture at data collection event 202, to infer that the user was engaged during period 212, after the gesture and prior to the movement.

Data collection event 206 can be a detected tilt or change of angle of the device, for example. The specific tilt of the device detected at data collection event 206 can then be used to infer engagement levels during periods 214 and/or 216, before and after the tilt, respectively. For example, if the data collection event 206 indicates that the device was tilted in a landscape angle facing the user, this tilt can be used to infer that the user is engaged in the presentation 200, and likely watching the screen on the device. By contrast, if the data collection event 206 indicates that the device was tilted in upside-down with the screen facing away from the user, this tilt information can then be used to infer that the user was not engaged in the presentation 200 during period 216, after the user tilted the device.

Data collection event 208 can be a lack of motion detected at the device. Such a lack of motion can be interpreted to mean that the device is stationary on a rigid surface, if the amount of motion detected at the device is below a threshold. Here, the threshold can be, for example, the amount of motion inevitably created by a user holding the device or otherwise moving the device. Such lack of motion can then be used to infer the user engagement levels during periods 216 and 218. For example, the lack of motion can be used to infer that period 218 is inactive, based on the assumption that the user has placed the device on a surface and was not thereafter engaged in the presentation 200. The lack of motion can also be used to infer engagement levels during period 216 or a portion of the period 216. For example, inactivity or disengagement can be attributed to a portion of period 216 based on the assumption that the user is not likely engaged during a period, such as thirty seconds, before the user places the device down and leaves it stationary on a surface.

The data collection events 202-208 can be analyzed individually and together to make determinations regarding user engagement levels. However, the data collection events 202-208 can also be analyzed in view of the time of one or more data collection events, and the current context of the user and/or presentation 200. For example, a lack of motion or activity detected at the device during a period in the presentation 200 that is expected to yield user activity or interaction, such as a gaming segment, can be used to make an inference or conclusion that the user is disengaged or inactive. By contrast, the same lack of motion or activity detected at the device during a period in the presentation 200 that is expected to yield little user activity or interaction, such as a video segment, can be used to make an inference or conclusion that the user is engaged or active. As another example, a gesture detected during a presentation prompt can be interpreted to indicate active user engagement levels. By contrast, the same gesture detected during a period of the presentation 200 where no input is expected from the user can be interpreted to indicate inactive user engagement levels, based on the assumption that the user inadvertently provided the gesture as a result of inattentiveness or otherwise because the user placed the device in his or her pocket/purse while traveling, for example. Thus, specific rules and configurations can specify varying—even conflicting—interpretations of the data collection events 202-208, based on additional information, such as other events, the current content of the presentation 200, a timing of the event(s), a user context, etc.

As previously explained, the information from data collection events 202-208 can be used to make inferences and determinations about the engagement levels of the user throughout the presentation 200. While specific inferences and determinations were described above, other inferences and determinations are contemplated herein. One of ordinary skill in the art will recognize that different conclusions or inferences can be configured for each specific type of event or combination of events. Moreover, rules for determining engagement levels can be configured, as further described below, to yield varying decisions based on event information, user context, device information, environment information, timing information, sensor data, and/or any combination of information. Further, as one of ordinary skill in the art will readily understand, different thresholds for detecting events or reaching a conclusion can be configured based on the desired results, previous results, specific sensitivity levels, specific engagement levels, and/or specific preferences.

Figure 3:
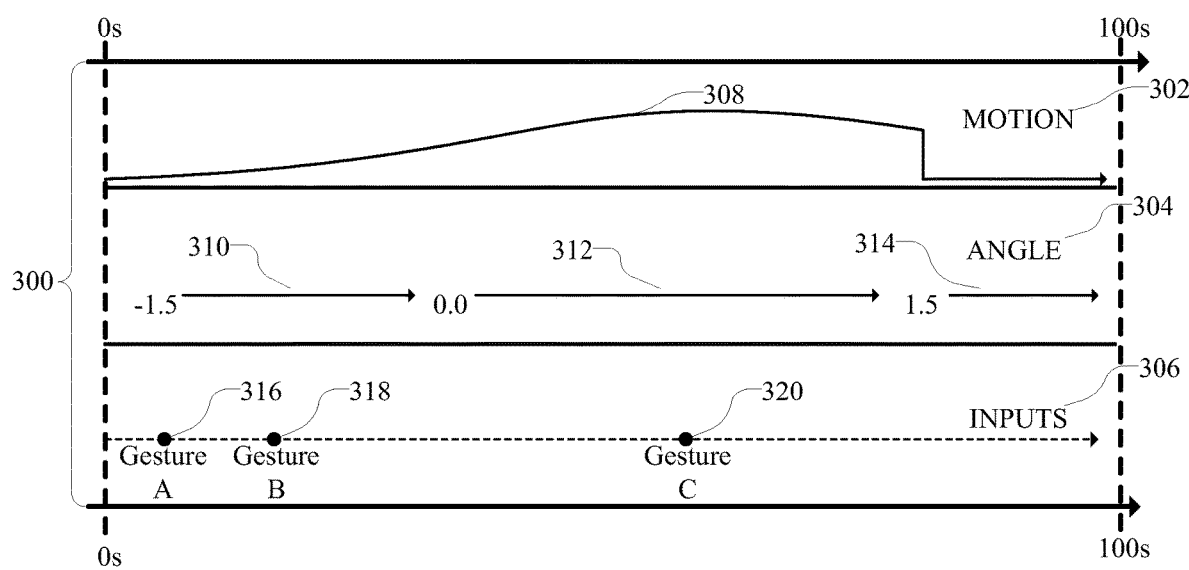
FIG. 3 illustrates an exemplary representation of a presentation with multiple types of data collection events.

FIG. 3 illustrates an exemplary representation of a presentation 300 with multiple types of data collection events. The presentation 300 includes data collected for motion events 302, angle events 304, and input events 306. The motion events 302 include a graph 308 of the motion events 302. The graph 308 provides a representation of the motion events 302 throughout the presentation 300. The motion events 302 can include any motion data, such as movement, velocity, acceleration, direction, etc. The graph 308 can include a continuous representation of the motion events 302 throughout the presentation 300, which can be generated by measuring and/or recording all of the motion events 302 in the presentation 300. In other cases, the graph 308 can plot the motion events 302 at specific intervals of the presentation 300. When measuring motions at only intervals of the presentation 300, it is also possible to infer the state of the device with regards to any motions based on the difference between motion events that are adjacent in time.

The graph 308 can provide a representation of the user's activity throughout the presentation 300 by detailing the various motions detected at the device throughout the presentation 300. For example, the graph 308 can indicate when the device was being held by the user, when the device was being moved by the user, and when the device was placed down by the user and left stationary at a surface. The activity of the user and the device, derived from the motion events 302 plotted in the graph 308 can provide an indication of the user's behavior during the presentation, which can be used to determine if the user was active (i.e., actively or passively engaged) or inactive (i.e., disengaged) during any portions of the presentation 308. Various rules can be used to define how data indicative of motions by the user should be interpreted and/or weighed. For example, a rule can specify that zero motion is a strong indication of inactive engagement levels and holding motion is a strong indication of active engagement levels. In some cases, the rule can also specify that traveling motion provides a low or medium indication of engagement levels, and can also specify that traveling motion should be considered with other factors, such as velocity or location, for example, which may indicate that the user is on a vehicle.

The angle events 304 provide details regarding the measured angles 310-314 or tilt of the device throughout the presentation 300. For example, segment 310 indicates a period of the presentation 300 where the device remained at an angle of −1.5, which refers to a portrait angle. In other words, the angle events 304 indicate that, during segment 310 of the presentation 300, the device remained in a portrait angle. In some cases, a portrait angle can be indicative of activity by the user, or at least more so than other angles, as it is an angle commonly associated with user engagement. Segment 312, on the other hand, indicates a period of the presentation 300 where the device maintained an angle of 0.0, which refers to a landscape angle. Thus, the angle events 304 indicate that the device was at a landscape angle during segment 312. Like the portrait angle, in some cases, the landscape angle can also serve as a factor that is indicative of user engagement, as landscape angles are often associated with user activity. Finally, segment 314 provides that the device was maintained at an angle of 1.5, which refers to an upside down angle, during that period of the presentation 300. In some cases, the upside down angle can be interpreted as an indication of inactive engagement levels, since this angle is not often associated with user activity.

Finally, the input events 306 indicate any inputs provided by the user during the presentation 300. Input events 306 can include, for example, a tap, a swipe, a pinch, a zoom, a shake, a voice command, a click, a navigation command, a touch, a button, a motion, etc. Moreover, in FIG. 3, input events 306 indicate gestures 316-320 provided by the user during the presentation 300. The data collected during the gestures 316-320 can include what specific types of gestures where provided by the user, the timing of the gestures, the content of the presentation 300 at the time of the gestures, whether the gestures resulted in an error, whether the gestures were expected inputs (e.g., match a list of possible gestures), etc. For example, the data collected during the gestures 316-320 can indicate whether the gestures 316-320 match to a list of possible gestures or inputs enabled for that portion of the presentation 300 (e.g., tapping on a defined button as opposed to tapping in a nontappable area). Any matches or mismatches can be known via an additional boolean payload in each gesture or input event, which reports whether the gesture or input triggered further events in the user session or not. The engagement levels determined for a segment of the presentation 300 during which multiple gestures were detected, can depend on, for example, whether all gestures or inputs match, whether no gestures or inputs match, whether a majority of gestures or inputs match, or proportionally depending on what portion of the gestures or inputs match.

The motion events 302, angle events 304, and input events 306 can be analyzed individually and/or in any combination to determine user engagement levels. Events 302-306 can be triggered or recognized based a specific thresholds defined for the different event types. Moreover, rules can be used to define the impact of an event either individually or in combination with other events and/or factors. Also, other events than those illustrated in FIG. 3 are contemplated herein. For example, sensors can be used to detect events associated with surrounding objects. In some embodiments, sensors can be implemented to detect movement or noise surrounding the device, such as steps or conversations, and collect relevant information for use in determining user engagement levels. Activity detected around the device can be indicative of the activity at the device, and therefore, can be used for determining user engagement levels. For example, steps detected around the device can indicate that the device is stationary on a surface and the user is walking around the device, and thus is not engaged in the presentation 300. Other events, such as acceleration events or pedometer events, can be used to determine if the device is traveling, or even whether the user is moving too fast to be actively engaged in the content. In some embodiments, the eye gaze of the user can be detected via a camera on the device and used to determine user engagement levels. As one of ordinary skill in the art will readily recognize, other passive and/or active events can be collected to determine user engagement levels, as further detailed below.

Figure 4:
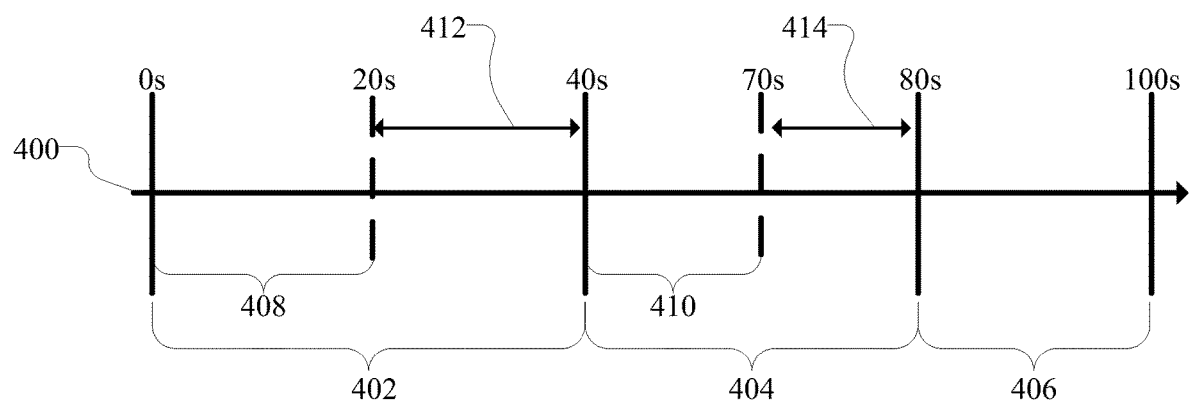
FIG. 4 illustrates an exemplary presentation partitioned into segments of activity.

FIG. 4 illustrates an exemplary presentation 400 partitioned into segments of activity. The presentation 400 includes segments 402-406, which are defined based on data collected during the presentation 400. The data used to determine segments 402-406 can include events, such as input or movement events, information about the content of the presentation, such as chapters of the presentation or content types of the presentation, and any other information as previously described. Segments 402 and 404 can be reduced to segments 408 and 410, respectively, based on periods of inactive user engagement 412 and 414, respectively. The periods of inactive user engagement 412 and 414 can be identified based on the data collected during the presentation 400, also used to define segments 402-406.

Segments 402 and 404 are reduced by periods 412 and 414 to yield segments 408 and 410. Segments 408 and 410 represent segments with active user engagement. Segment 406 was not reduced by any period of inactive user engagement, and thus similarly represents a segment of active user engagement, or active segment. The length of the active segments 406-410 can be combined to determine a total time spent by the user engaging in the presentation 400. Here, the total time spent accounts for the periods in the presentation 400 predicted to include active user engagement levels, and does not include inactive periods 412 and 414.

Figure 5:
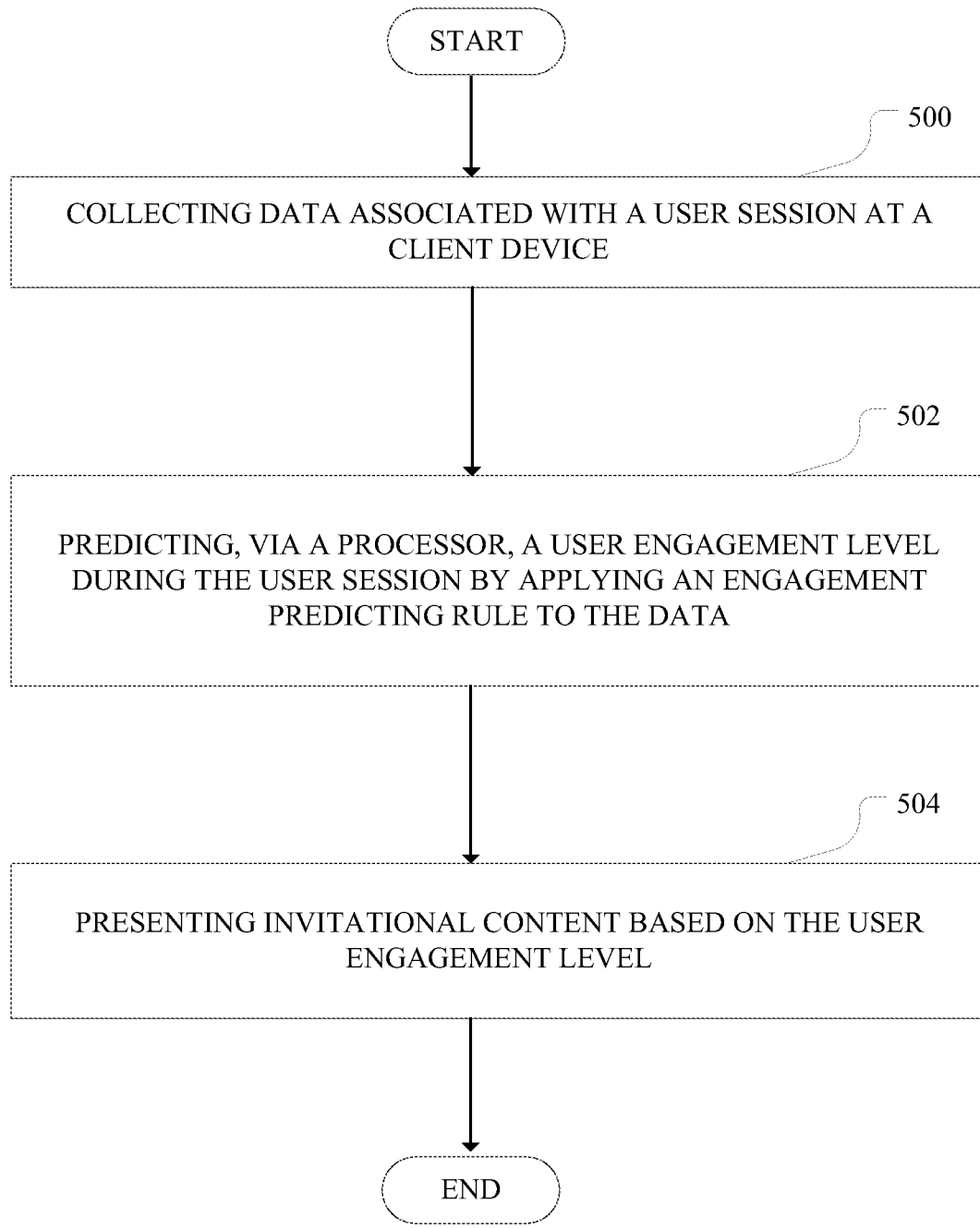
FIG. 5 illustrates an exemplary method embodiment.

Having disclosed some basic system components and concepts, the disclosure now turns to the exemplary method embodiment shown in FIG. 5. For the sake of clarity, the method is described in terms of a content delivery system 106, as shown in FIG. 1, configured to practice the method. The steps outlined herein are exemplary and can be implemented in any combination thereof, including combinations that exclude, add, or modify certain steps.

The content delivery system 106 first collects data associated with a user session at a client device (500). The client device can be a mobile device, a laptop, a smartphone, smart glasses, a tablet computer, a desktop computer, a portable media player, a smart television, a gaming system, or any other device. In some embodiments, the client device can be a computing device such as system 600, illustrated in FIG. 6A below. Moreover, the user session can include a single session, a group of sessions, a campaign of invitational content, a presentation, etc. In some embodiments, the user session is a presentation of content at the client device. Here, the presentation can include any type of content, such as an advertisement, a video, audio content, a file, text, an image, and/or any other type of media content.

The data can include information about the type of content presented at the client device during the user session. The type of content presented can help define or predict what type of interaction or engagement is expected from the user. For example, the data can indicate that the presentation includes video content, which can suggest that the content delivery system 106 should expect a passive engagement by the user, where the user simply watches the video content without actively interacting with the content. By contrast, the data can indicate that the presentation includes gaming content, and thus suggest that the content delivery system 106 should expect an interactive engagement by the user. Thus, if the content delivery system 106 detects user inactivity, the type of content in the presentation indicated by the data can be informative with respect to whether the user is inactive because the user is disengaged or because the user is passively engaged.

The data can also include information about one or more user interactions in the user session. For example, the data can include any inputs associated with the user session, such as a gesture, a view, a request, a click, an activity, a navigation command, an action, etc. The data can also include details about the inputs, how the inputs were provided, how the inputs were expected to be provided, whether any errors were triggered, context information regarding the inputs, and so forth. For example, the data can indicate that the user swiped an area of the client device that is not within the boundaries of an expected or permitted input, such as a swipe. Such an unexpected input can suggest that the user was distracted or disengaged when he or she provided the input. For example, the input can be an accidental input received by the client device while the client device was in the user's pocket or purse.

The data can also include sensor data. The sensor data can refer to any data collected, measured, captured, or detected by a sensor, such as a sensor on the client device. For example, the sensor data can include data obtained from an accelerometer, a gyroscope, a GPS, a camera, a microphone, a touch screen, a light sensor, a scanner, a magnetometer, a pedometer, a timer, etc. In some embodiments, the sensor data can include information regarding the angle or plane of the client device, the motion or movement of the client device, the motion or movement of surrounding objects, the position or location of the client device, an eye gaze of a user at the client device, and/or an amount of ambient light. The sensor data can also include changes to any of the previously-described information. For example, the sensor data can include a change in the position or location of the client device.

The data can be collected at one or more specific times within the user session. For example, the data can be collected at predefined times or intervals throughout the user session. In some cases, the data can be collected at regular intervals during the user session. For example, the data can be collected every five seconds throughout the user session. In other cases, the data can be collected continuously throughout the user session. Moreover, the data can be associated with one or more portions of the user session. For example, the data can represent information collected within the first five minutes of the user session. Further, the data can be associated with the entire user session. For example, the data can represent information collected throughout the entire user session. In some cases, the data can include all user interactions or inputs throughout the entire user session, all detected movements or motions of the client device throughout the user session, every position of the client device throughout the user session, every location of the client device throughout the user session, etc.

Next, the content delivery system 106 can predict a user engagement level during the user session by applying an engagement predicting rule to the data (502). The user engagement level can specify, for example, whether the user is/was active, inactive, attentive, inattentive, engaged (passively or actively), disengaged, etc. The engagement predicting rule can refer to one or more rules and conditions.

Moreover, the engagement predicting rule can define a type of activity or condition associated with one or more predefined user engagement levels. For example, the engagement predicting rule can specify that an input from the user indicates active engagement by the user. The engagement predicting rule can also include additional conditions associated with a type of activity, and further define user engagement levels associated with the additional conditions. For example, the engagement predicting rule can specify that input from the user indicates active engagement by the user, unless the input is unexpected input or incorrect input. Thus, if the user is expected to swipe the top of the screen, the engagement predicting rule can specify the a swipe at the top of the screen from the user indicates active engagement, but a different type of input, such as a click at the bottom of the screen, indicates inactive engagement.

The engagement predicting rule can also include a threshold for satisfying one or more user engagement levels. Moreover, the engagement predicting rule can include a threshold for any activities and/or conditions associated with a user engagement level. For example, the engagement predicting rule can specify one or more types of activities that must be detected by the system to satisfy a user engagement level of active, and a threshold amount of activity that must be detected for the one or more types of activities in order to positively detect the one or more types of activities. To illustrate, the engagement predicting rule can specify that one way that a user engagement level of active would be satisfied is if the data identifies at least a negligible amount of movement and at least a certain amount of likelihood that the client device is facing upward, facing the user, and/or within a specific distance relative to the user's eyes. In some embodiments, the engagement predicting rule can assume that when a user is holding the client device, the sensors in the client device will be able to detect at least some amount of motion or movement, and that only if the client device is static, on a rigid surface, will there be no detection of any motion or movement, and thus, even small amounts of detected motion or movement is sufficient to indicate that the user is holding the client device and therefore engaged in the content at the client device. Similarly, if the data does not indicate any motion or movement at all, the system can assume that the client device is not being held by the user, and this can indicate that the user is inactive—although the engagement predicting rule can specify one or more requirements or conditions to reach a determination that the user is inactive.

In some embodiments, the engagement predicting rule can specify a first threshold for a single activity or condition to satisfy an engagement level, without more, and a second threshold for that activity or condition to satisfy the engagement level when combined with another activity or condition. For example, the engagement predicting rule can specify that a correct gesture detected from a user within the last five seconds alone is sufficient to satisfy an active engagement level. Here, the first threshold is the gesture within five seconds. On the other hand, the engagement predicting rule can specify that if the gesture is detected within more than five seconds but less than ten seconds, the gesture can be sufficient to satisfy an active engagement level if another activity or condition is satisfied, such as a motion or movement being detected. Thus, for example, if the gesture is detected within seven seconds, the gesture can indicate an active user engagement if, in addition to the gesture, the system detects some movement. In this example, the second threshold refers to the gesture being more than five seconds but less than ten seconds. In other embodiments, the engagement predicting rule can specify multiple levels of thresholds and criteria, where different outcomes are defined for the same activity or condition based on varying thresholds, and different outcomes are also defined for different combinations of activities or conditions based on respective thresholds and/or the types of activities or conditions.

The engagement predicting rule can also include one or more exceptions. For example, the engagement predicting rule can include exceptions for specific types of content where a user engagement is expected to be different. In some cases, the engagement predicting rule can include an exception for video content, which the user typically consumes passively. Thus, the engagement predicting rule can specify that, in some cases where no motion or movement is detected at the client device and the rule would otherwise indicate a user engagement level of inactive or disengaged, the user engagement level can be active if the relevant content includes video content.

In some embodiments, the user engagement level can be determined or predicted by comparing sensor data with one or more predetermined threshold values to identify a motion or movement of the client device. Here, the motion or movement can include, for example, stationary, holding (i.e., being held by a user), user propelled movement, or traveling, such as traveling by automobile, train, bicycle, horse, or airplane, depending on the characteristics of the motion or movement detected. In some cases, the user engagement level can be active if the content delivery system 106 determines that the user is holding the client device within a threshold, and inactive if the content delivery system 106 determines that the client device is stationary. However, the content delivery system 106 can otherwise set the engagement level as active if the content delivery system 106 determines that the client device is stationary but the relevant content includes video content (e.g., the user session includes a presentation of video content) or the content delivery system 106 has recently detected user activity (e.g., user activity within a threshold time).

The content delivery system 106 can then present content based on the user engagement level (504). The content delivery system 106 can also modify a presentation of content based on the user engagement level. For example, if the user engagement level is inactive, the content delivery system 106 can pause the presentation of content until the user engagement level changes to active or attentive. Here, the content delivery system 106 can make different determinations of user engagement level as the presentation of content or user session progresses (e.g., periodically), pause the presentation of content when a user engagement level is inactive, and resume the presentation of content when the user engagement level changes back to active or attentive. The content delivery system 106 can also record user engagement levels and associated content or user session information, and/or report such information to another device or server, for example. The content delivery system 106 can keep statistics of user engagement levels and target content based on previous user engagement levels. For example, if the content delivery system 106 determines that a first advertisement is associated with inactive user engagement levels but a second advertisement is associated with more active user engagement levels (i.e., more instances of active levels and/or higher levels of engagement), then the content delivery system 106 can select to send the second advertisement in lieu of, or in addition to, the first advertisement, or otherwise modify a campaign of invitational content based on the statistics associated with the user engagement levels.

Figure 6B:
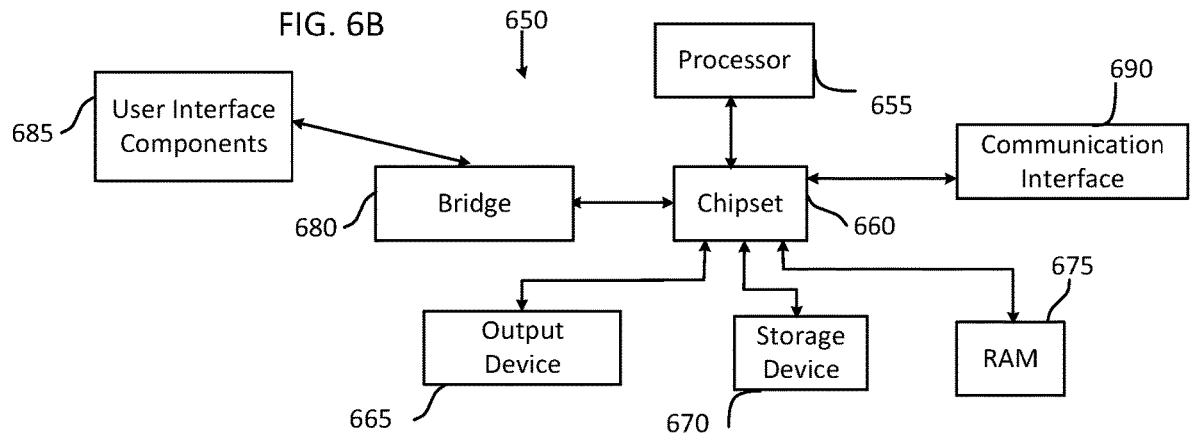
FIG. 6A and FIG. 6B illustrate exemplary system embodiments.
Figure 6A:
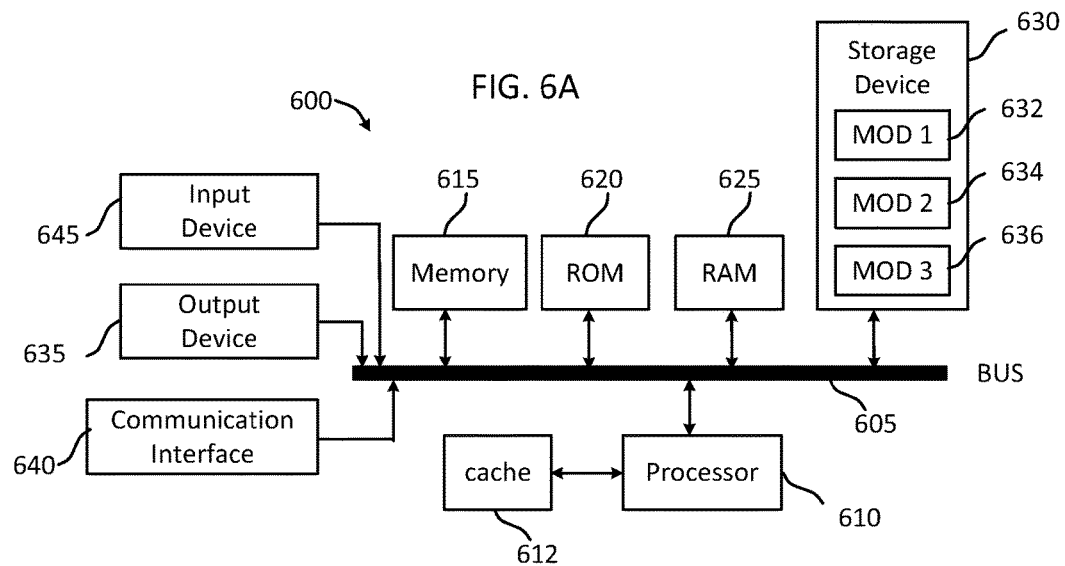

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A system comprising:
   at least one processor; and
   at least one computer-readable storage medium storing instructions which, when executed by the at least one processor, causes the at least one processor to:
   identify content for presentation at a mobile device;
   initiate a user session to present the content to the mobile device during a user session;
   determine, based on data collected during the user session at the mobile device, a type of the content presented at the mobile device during the user session and inputs with the content at the mobile device during the user session, wherein the type of the content is designed to either solicit or not solicit inputs;
   determine a user engagement level during the user session based on one or more engagement predicting rules and the type of the content presented at the mobile device during the user session and the inputs with the content at the mobile device during the user session; and
   determine whether to present a specific media content item based on one or more content triggering rules and the user engagement level.

2. The system of claim 1, wherein the one or more engagement predicting rules define user engagement levels based on the type of content presented at the mobile device during the user session and an amount or type of inputs with the content at the mobile device during the user session.

3. The system of claim 1, wherein the one or more engagement predicting rules define user engagement levels based on the type of content presented at the mobile device during the user session and least one of sensor data indicating a motion status of the mobile device.

4. The system of claim 1, wherein the one or more content triggering rules further comprising a first instruction to present the specific media content item at the mobile device during the user session when the user engagement level exceeds a threshold engagement level.

5. The system of claim 1, wherein the one or more content triggering rules further comprising a second instruction to forego presenting the specific media content item at the mobile device during the user session when the user engagement level does not exceed a threshold engagement level.

6. The system of claim 1, wherein the data comprises sensor data of the mobile device.

7. The system of claim 1, comprising further instructions which when executed by the at least one processor causes the at least one processor to:
pause the presentation of content in response to determining, based on the user engagement level, that there is no engagement with the presentation of content; and
resume the presentation of content when a subsequent user engagement level calculated at a later period of time during the presentation indicates interaction or engagement with the presentation of content.

8. The system of claim 1, comprising further instructions which when executed by the at least one processor causes the at least one processor to:
blacklist a content item when a user engagement level with the content item is below a threshold engagement level; and
prioritize one or more specific media content items when the user engagement level with the content item is above or equal to a threshold engagement level.

9. A computer-implemented method comprising:
identifying, using a processor, content for presentation at a mobile device;
initiating, using the processor, a user session to present the content to the mobile device during a user session;
determining, based on data collected during the user session at the mobile device, a type of the content presented at the mobile device during the user session and inputs with the content at the mobile device during the user session, wherein the type of the content is designed to either solicit or not solicit inputs;
determining, via the processor, a user engagement level during the user session based on one or more engagement predicting rules;
determining, using the processor, whether to present a specific media content item based on one or more content triggering rules.

10. The method of claim 9, wherein the one or more engagement predicting rules define user engagement levels based on the type of content presented at the mobile device during the user session and an amount or type of inputs with the content at the mobile device during the user session.

11. The method of claim 9, wherein the one or more engagement predicting rules define user engagement levels based on the type of content presented at the mobile device during the user session and least one of sensor data indicating a motion status of the mobile device.

12. The method of claim 9, wherein the one or more content triggering rules further comprising a first instruction to present the specific media content item at the mobile device during the user session when the user engagement level exceeds a threshold engagement level.

13. The method of claim 9, wherein the one or more content triggering rules further comprising a second instruction to forego presenting the specific media content item at the mobile device during the user session when the user engagement level does not exceed a threshold engagement level.

14. The method of claim 9, further comprising:
pausing the presentation of content in response to determining, based on the user engagement level, that there is no engagement with the presentation of content; and
resuming the presentation of content when a subsequent user engagement level calculated at a later period of time during the presentation indicates interaction or engagement with the presentation of content.

15. The method of claim 9, further comprising:
blacklisting a content item when a user engagement level with the content item is below a threshold engagement level; and
prioritizing one or more specific media content items when the user engagement level with the content item is above or equal to a threshold engagement level.

16. At least one non-transitory computer-readable storage medium storing instructions which, when executed by at least one processor, causes the at least one processor to:
identify content for presentation at a mobile device;
initiate a user session to present the content to the mobile device during a user session;
determine, based on data collected during the user session at the mobile device, a type of the content presented at the mobile device during the user session and inputs with the content at the mobile device during the user session, wherein the type of the content is designed to either solicit or not solicit inputs;
determine a user engagement level during the user session based on one or more engagement predicting rules;
determine whether to present a specific media content item based on one or more content triggering rules.

17. The at least one non-transitory computer-readable storage medium of claim 16, wherein the one or more engagement predicting rules define user engagement levels based on the type of content presented at the mobile device during the user session and an amount or type of inputs with the content at the mobile device during the user session.

18. The at least one non-transitory computer-readable storage medium of claim 16, wherein the one or more engagement predicting rules define user engagement levels based on the type of content presented at the mobile device during the user session and least one of sensor data indicating a motion status of the mobile device.

19. The at least one non-transitory computer-readable storage medium of claim 16, wherein the one or more content triggering rules further comprising a first instruction to present the specific media content item at the mobile device during the user session when the user engagement level exceeds a threshold engagement level.

20. The at least one non-transitory computer-readable storage medium of claim 16, wherein the one or more content triggering rules further comprising a second instruction to forego presenting the specific media content item at the mobile device during the user session when the user engagement level does not exceed a threshold engagement level.

* * * * *